(12) United States Patent
Sahu et al.

(10) Patent No.: US 6,765,189 B1
(45) Date of Patent: Jul. 20, 2004

(54) SMALL FORM FACTOR IN-LINE SWITCHED MULTICHANNEL FIBER OPTIC POWER MONITORING APPARATUS

(75) Inventors: Saroj Kumar Sahu, Landing, NJ (US); Richard A. Cordasco, Shrewsbury, NJ (US)

(73) Assignee: Santec U.S.A. Corporation, Hackensack, NJ (US)

(*) Notice: Subject to any disclaimer, the term of this patent is extended or adjusted under 35 U.S.C. 154(b) by 0 days.

(21) Appl. No.: 10/300,192

(22) Filed: Nov. 20, 2002

(51) Int. Cl.[7] .............................. H01J 40/14; G02B 6/42
(52) U.S. Cl. ......................... 250/214 A; 250/214 LA; 250/214 LS; 385/48
(58) Field of Search .......................... 385/48; 356/222, 356/226; 250/214 AG, 214 A, 214 LA, 214 LS, 214 R, 214 DC, 227.14, 227.11; 380/59, 308, 309

(56) References Cited

U.S. PATENT DOCUMENTS

| | | | |
|---|---|---|---|
| 4,902,886 A | * | 2/1990 | Smisko |
| 4,953,155 A | * | 8/1990 | Tangonan |
| 5,115,124 A | * | 5/1992 | Muto |
| 5,317,523 A | * | 5/1994 | Masten |
| 5,693,934 A | * | 12/1997 | Hohmoto |
| 5,708,265 A | | 1/1998 | Poole |
| 5,748,302 A | | 5/1998 | Unno |

FOREIGN PATENT DOCUMENTS

JP 62017621 1/1987

* cited by examiner

Primary Examiner—David Porta
Assistant Examiner—David C Meyer
(74) Attorney, Agent, or Firm—Richard M. Goldberg

(57) ABSTRACT

A switched multichannel fiber optic power monitoring apparatus, includes a plurality of photodetectors, each connected to a tap of a different optical line for converting an optical signal therefrom to an electrical signal, a single switch having inputs connected to outputs of each of the photodetectors for receiving the output electrical signal from each photodetector and for switching the output electrical signals in a multiplexed manner to an output thereof as a multiplexed electrical signal, an amplifier amplifying the multiplexed electrical signal, an analog to digital converter which converts the amplified electrical signal to a digital signal, and a microprocessor which provides an output measurement signal in response to the digital signal, the microprocessor being connected to the switch to control the length of time that the switch is open for each optical line, and connected with the amplifier to control amplification thereof.

17 Claims, 5 Drawing Sheets

SMALL FORM FACTOR IN-LINE SWITCHED MULTICHANNEL FIBER OPTIC POWER MONITORING APPARATUS

BACKGROUND OF THE INVENTION

The present invention relates generally to multichannel fiber optical power monitoring apparatus, and more particularly, is directed to a switched multichannel fiber optical power monitoring apparatus.

It is known to tap an optical fiber in order to detect and measure the optical signal carried by the optical fiber. In such case, it is important that only a small percentage of the incoming light signal, that is, a small percentage of the optical power, be utilized for such detection and measurement. Such detection and measurement is useful, for example, to indicate the system performance, and is also used for maintenance and control of the optical line.

Conventionally, a fiber optic tap is placed in the optical path to extract a small fraction of the optical power from the optical path. This can be provided by a tap which then supplies the optical signal to a photodiode which converts the optical signal to an electrical signal. With such arrangement, there is low optical line loss and low polarization dependent loss (PDL). The electrical signal is then supplied to a micro-controller through a logarithmic amplifier.

However, in many instances, a plurality of optical paths or channels must be monitored. In such case, conventional practice provides a tap photodiode for each optical path, with a logarithmic amplifier connected to the output of each photodiode. Because an amplifier is provided for each photodiode, there is an increased cost due to a large number of parts, and an increased size in the circuitry.

OBJECTS AND SUMMARY OF THE INVENTION

Accordingly, it is an object of the present invention to provide a switched multichannel fiber optic power monitoring apparatus that overcomes the problems with the aforementioned prior art.

It is another object of the present invention to provide a switched multichannel fiber optic power monitoring apparatus which is greatly reduced in size.

It is still another object of the present invention to provide a switched multichannel fiber optic power monitoring apparatus which is greatly reduced in cost.

It is yet another object of the present invention to provide a switched multichannel fiber optic power monitoring apparatus which imparts a smaller amount of noise into the electrical signal.

It is a further object of the present invention to provide a switched multichannel fiber optical power monitoring apparatus which can easily control the switching times for the different channels to account for low light and other situations.

It is a still further object of the present invention to provide a switched multichannel fiber optic power monitoring apparatus that is easy and economical to use and manufacture.

In accordance with an aspect of the present invention, a switched multichannel fiber optic power monitoring apparatus, includes a plurality of photodetectors, each connected to a different optical line for converting an optical signal from the respective optical line to an electrical signal. There is at least one switch, the number of switches being less than the number of photodetectors, each switch having inputs connected to outputs of each of a plurality of the photodetectors for receiving the output electrical signal from each of the photodetectors and for switching the output electrical signals in a multiplexed manner to an output thereof as a multiplexed electrical signal. At least one amplifier is provided for amplifying the multiplexed electrical signal, the number of amplifiers being less than the number of photodetectors. An analog to digital converter converts the amplified electrical signal to a digital signal, and a microprocessor provides an output measurement signal in response to the digital signal.

The microprocessor is connected to the switch to control a length of time that the at least one switch is open for each optical line, and is connected with the at least one amplifier to control amplification by the amplifier. Preferably, each amplifier includes a logarithmic amplifier, and each photodetector is an integrated photodetector.

In one embodiment, each photodetector is connected to a tap of one of the optical lines for converting the optical signal from the respective optical line to the electrical signal, and in another embodiment, each photodetector receives the entire signal from one of the optical lines.

In accordance with a further embodiment of the present invention, the at least one switch includes a plurality of first switches and a second switch. Each of the first switches has inputs connected to outputs of each of a plurality of the photodetectors for receiving the output electrical signal from each of the photodetectors and for switching the output electrical signals in a multiplexed manner to an output thereof as a first multiplexed electrical signal, and the second switch has inputs connected to outputs of the first switches for switching the first multiplexed electrical signals in a multiplexed manner to an output thereof as a second multiplexed electrical signal which is supplied to the amplifier.

In accordance with a still further embodiment of the present invention, the at least one switch includes a plurality of switches, each having inputs connected to outputs of each of a plurality of the photodetectors for receiving the output electrical signal from each of the photodetectors and for switching the output electrical signals in a multiplexed manner to an output thereof as a first multiplexed electrical signal, and the at least one amplifier includes a plurality of amplifiers, each amplifier having an input connected with an input of a respective one of the switches. As one aspect thereof, outputs from the amplifiers are supplied directly to the microprocessor, while according to a modification, a further switch is provided having inputs connected to outputs of each of the amplifiers and for switching output signals from the amplifiers in a multiplexed manner to the microprocessor.

Preferably, the output measurement signal is a calibrated signal which is calibrated with respect to at least one of the following: temperature; input optical level; input optical wavelength and polarizations; and device parameters of the photodetectors, each switch, each amplifier, the analog to digital converter and the microprocessor.

The above and other objects, features and advantages of the invention will become readily apparent from the following detailed description thereof which is to be read in connection with the accompanying drawings.

DETAILED DESCRIPTION

Figure 1:
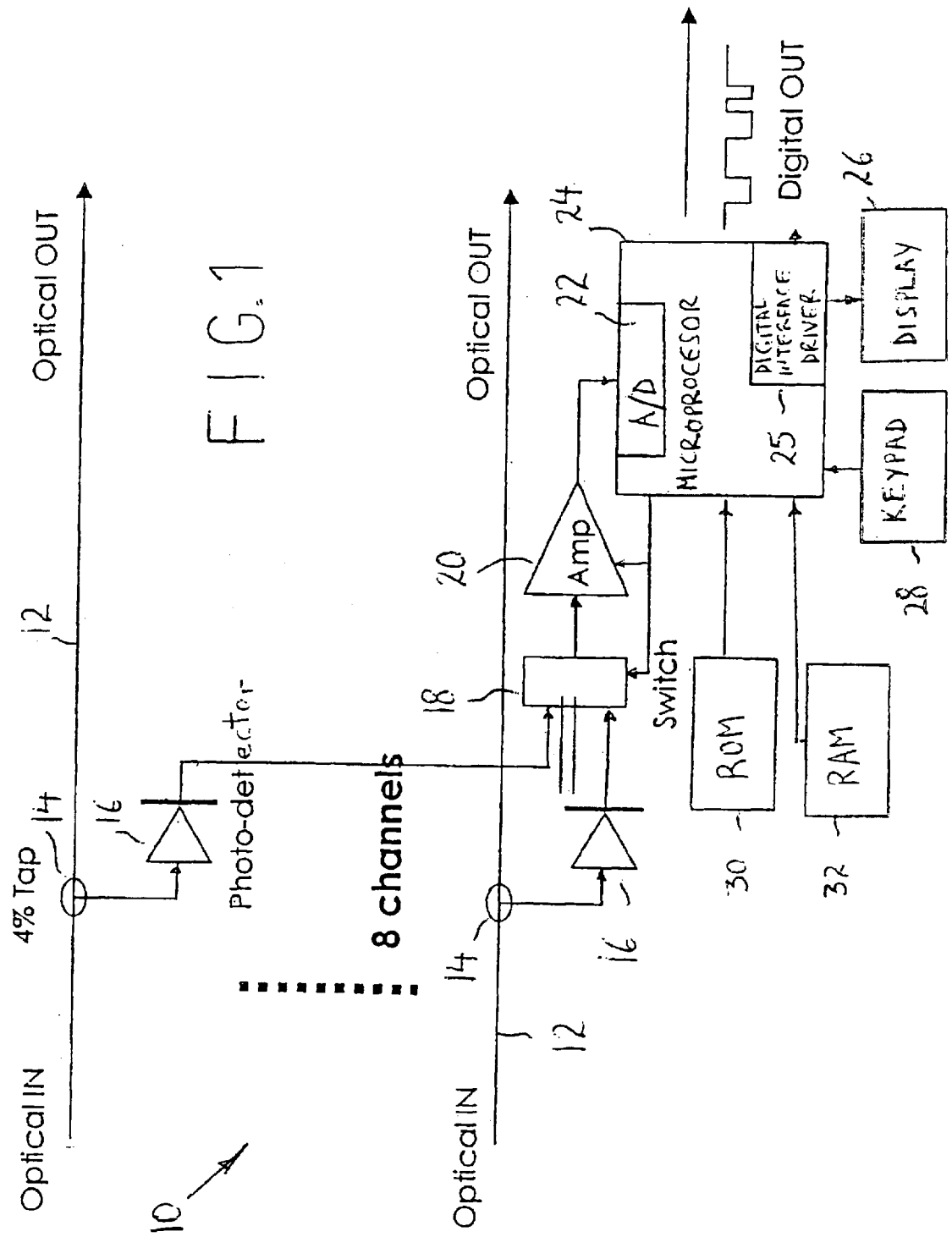
FIG. 1 is a circuit wiring diagram of a switched multichannel fiber optic power monitoring apparatus according to a first embodiment of the present invention.

Referring to the drawing in detail, and initially to FIG. 1 thereof, a switched multichannel fiber optic power monitoring apparatus 10 according to the present invention is adapted to monitor the optical signal from a plurality n of in-line optical channels or fibers 12. Specifically, an optical tap 14 is provided for each optical fiber 12 to tap off a small percentage, for example, 4%, of the incoming optical signal. The optical output from each optical tap 14 is then supplied to the input of a tap photodetector 16 associated with each optical fiber 12. Preferably, each photodetector 16 is a known integrated photodetector which has an optical tap integrated therewith. Each photodetector 16 converts the tapped optical signal to an electrical signal.

However, unlike conventional systems, the outputs from all photodetectors 16 from all n channels, are supplied through a multiplexer switch 18, in a multiplexed manner, to a single logarithmic amplifier 20 having a large dynamic range of, for example, 70 dB with a highly sensitive response of better than 0.1 dB. As a result, the large number of logarithmic amplifiers found in conventional systems is eliminated, thereby reducing the size and the cost of the apparatus.

The output from amplifier 20 is supplied to a microcontroller or microprocessor 24, and specifically, to an analog to digital (A/D) converter 22 which forms part of microprocessor 24, where the electrical output is converted to a digital signal. Microprocessor 24 measures the signal and provides a calibrated output in digital form in response thereto. The calibration can be with respect to temperature, input optical level, input optical wavelength and polarizations, and device parameters of the various optical and electrical components. In this regard, microprocessor 24 includes a digital interface driver 25 that provides the digitized output.

Microprocessor 24 can optionally be connected to a display 26 for displaying the results. A keyboard or keypad 28 can also be connected to microprocessor 24 for controlling operation thereof. A random access memory (RAM) 30 as a working memory and a read only memory (ROM) 32 as a permanent storage memory for operating programs and the like are preferably also connected to microprocessor 24.

Microprocessor 24 is also connected to multiplexer switch 18 and logarithmic amplifier 20 to control operation thereof. In this regard, microprocessor 24 can control the parameters of logarithmic amplifier 20. Also, microprocessor can selectively control the length of time that multiplexer switch 18 is switched on for each of the n channels. For example, when there is low light from one of the optical channels, switch 18 can be switched on for a longer period of time for that optical channel for improved measurement of the optical signal. The switching time for each channel can therefore be individually controlled by external commands from keyboard 28 or can be adaptably controlled by microprocessor 24 in accordance with the operating software stored in RAM 32. In addition, microprocessor 24 can control switch 18 to view only one channel, or only certain channels.

Figure 2:
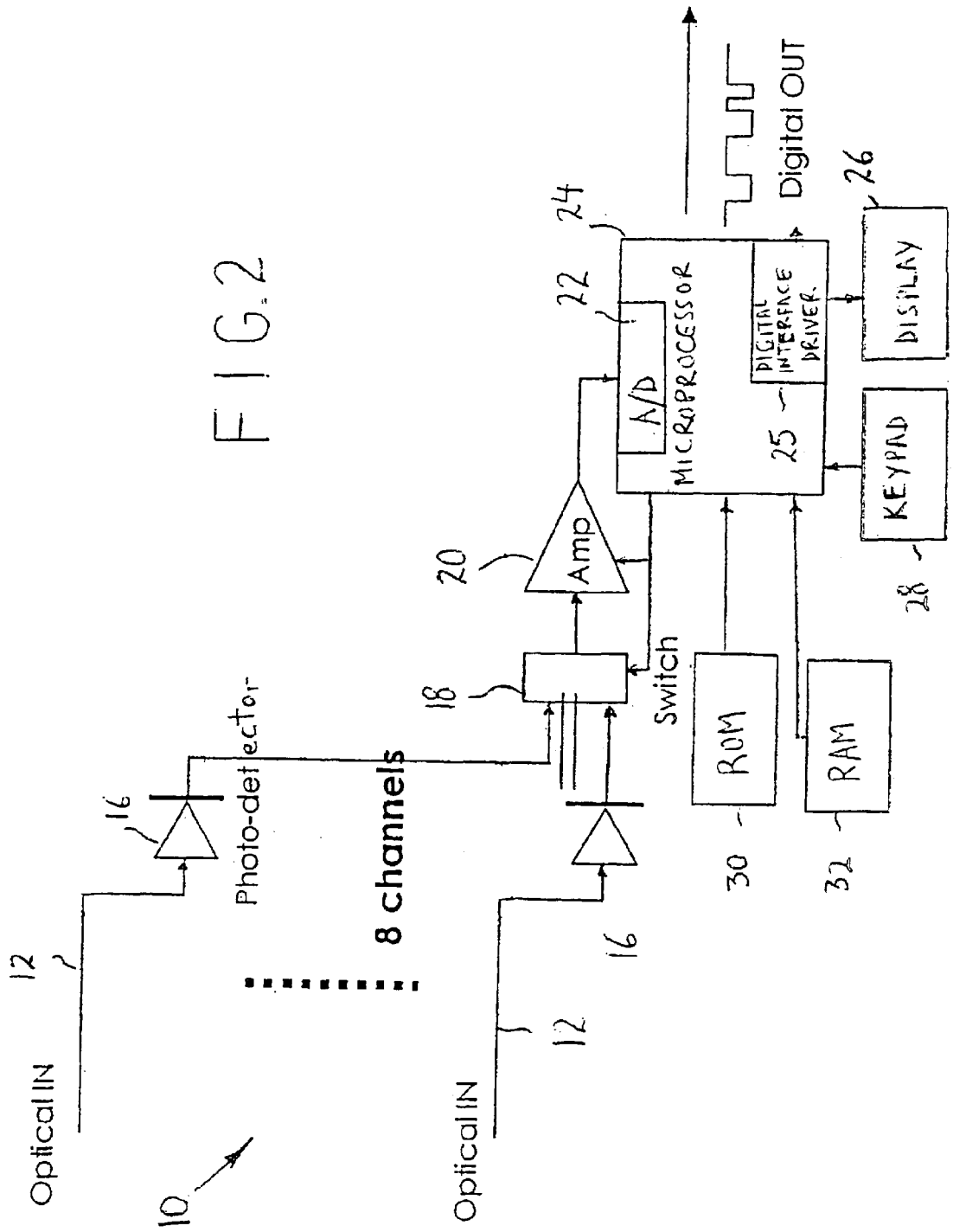
FIG. 2 is a circuit wiring diagram of a switched multichannel fiber optic power monitoring apparatus according to a second embodiment of the present invention.

Alternatively, as shown in FIG. 2, in some situations, the entire optical signal can be supplied to each photodetector 16 so that tap 14 is eliminated. In such case, the optical signal is terminated at each photodetector 16.

Figure 3:
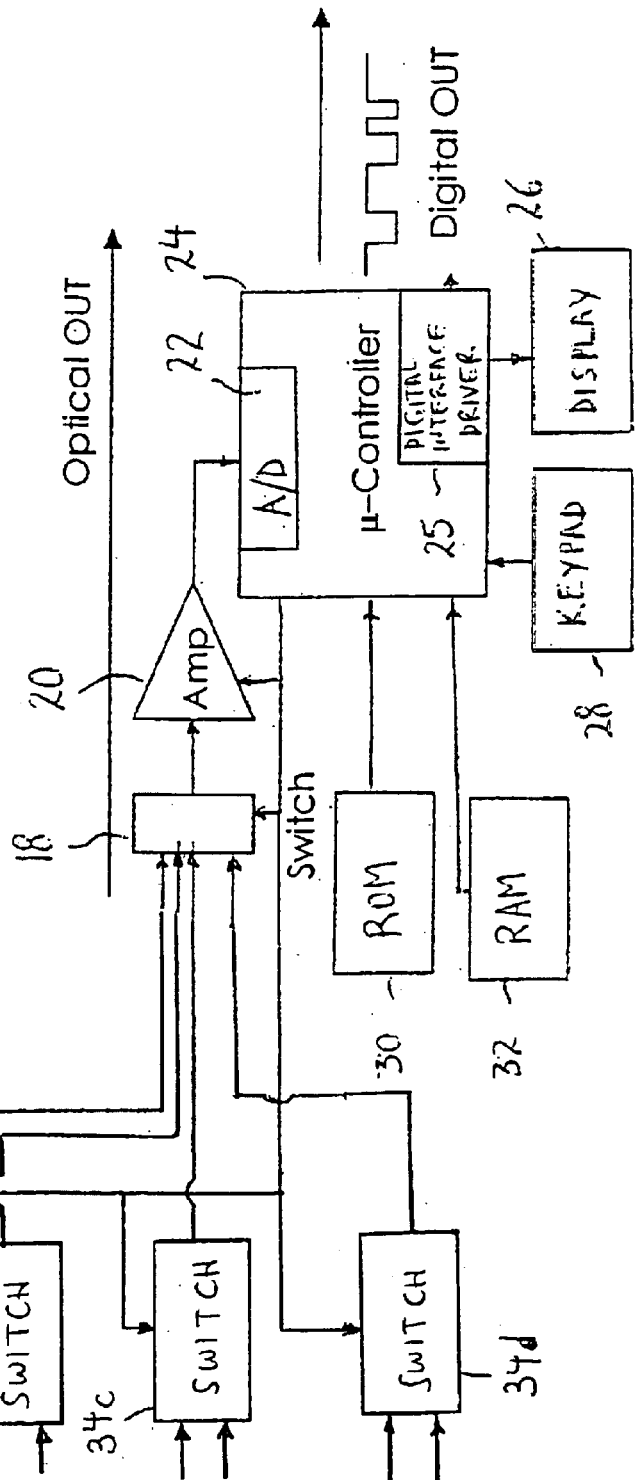
FIG. 3 is a circuit wiring diagram of a switched multichannel fiber optic power monitoring apparatus according to a third embodiment of the present invention.

Referring now to FIG. 3, there is shown a third embodiment of a switched multichannel fiber optic power monitoring apparatus according to the present invention in which a plurality of switches 34a–34d are provided, each switch 34a–34d connected to receive the output from two tap photodetectors 16 from two separate optical channels or fibers 12. The inputs to switches 34a–34d are also controlled by microprocessor 24 to output the signal from the respective photodetectors 16 in a multiplexed manner to switch 18, which in turn, is controlled by microprocessor 24 to output the signals from the respective switches 34a–34d in a multiplexed manner to microprocessor 24.

Figure 4:
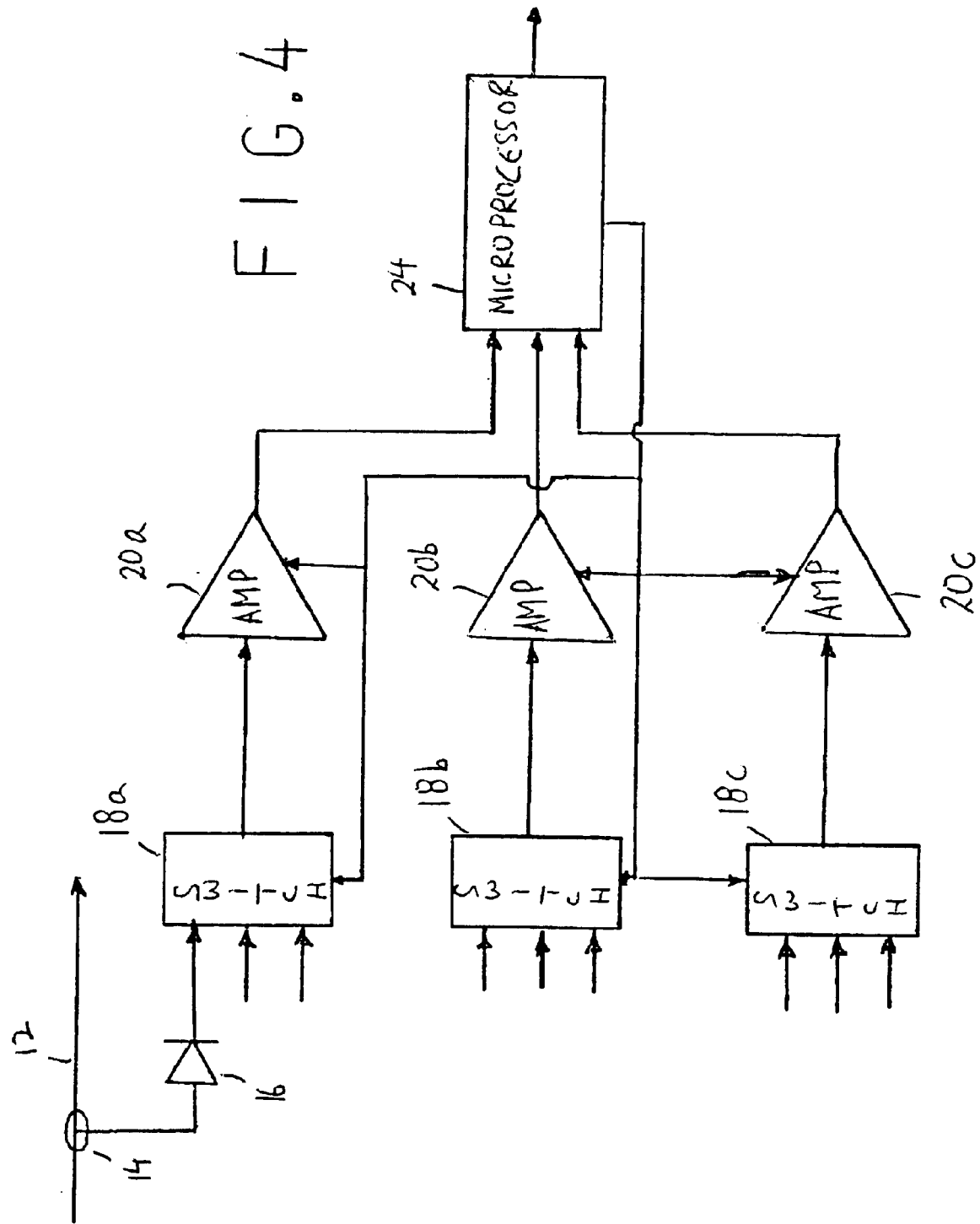
FIG. 4 is a circuit wiring diagram of a switched multichannel fiber optic power monitoring apparatus according to a fourth embodiment of the present invention.

Referring now to FIG. 4, there is shown a fourth embodiment of a switched multichannel fiber optic power monitoring apparatus according to the present invention in which amplifier 20 is replaced with a plurality of, for example, three, amplifiers 20a–20c and switch 18 is replaced with a plurality of, for example, three switches 18a–18c. In this embodiment, there are nine channels, and each switch 18a–18c receives the outputs from three photodetectors 16 corresponding to three different channels. Each switch 18a–18c outputs these signals in a multiplexed manner to the respective amplifier 20a–20c, which supplies the amplified multiplexed signals to microprocessor 24. The timing of switches 18a–18c and the amplification of amplifiers 20a–20c are controlled by microprocessor 24.

Figure 5:
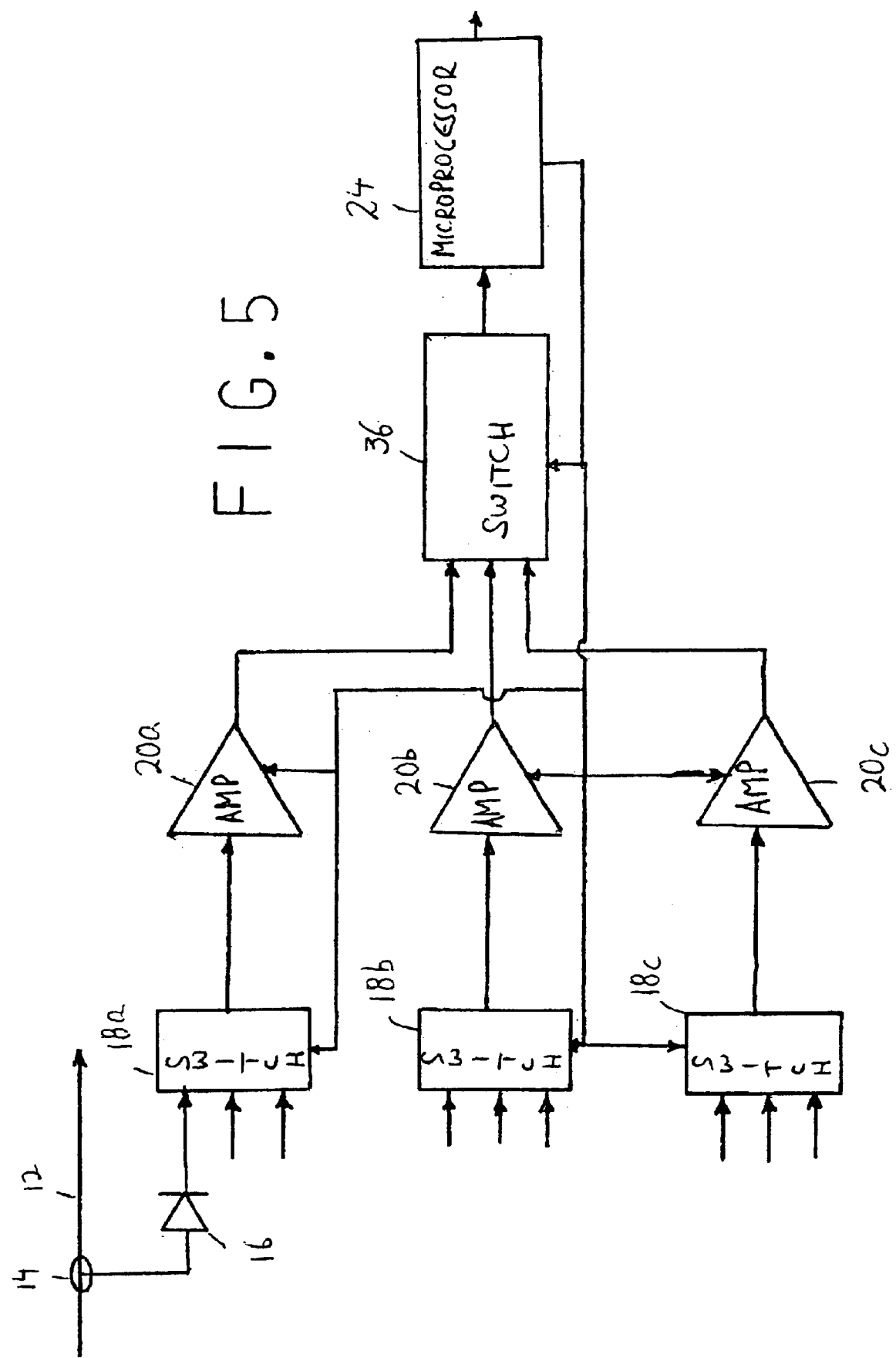
FIG. 5 is a circuit wiring diagram of a switched multichannel fiber optic power monitoring apparatus according to a fifth embodiment of the present invention.

A modification of the embodiment of FIG. 4 is shown in FIG. 5 in which the outputs from amplifiers 20a–20c are first supplied to a further switch 36 that outputs the signals in a multiplexed manner to microprocessor 24.

It will be appreciated that, in all of the above embodiments, a switched multichannel fiber optic power monitoring apparatus is provided which is greatly reduced in size and cost, and imparts a smaller amount of noise into the electrical signal. Further, with the present invention, control of the switching times for each of the different channels can be adjusted to account for low light and other situations.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

What is claimed is:

1. A switched multichannel tapped fiber optic power monitoring apparatus, comprising:

a plurality of photodetectors, each photodetector connected to a tap of a different optical line for converting a small portion of an optical signal from the respective optical line to an electrical signal, at least one switch, the number of switches being less than the number of photodetectors, each switch having inputs connected to outputs of each of a plurality of said photodetectors for receiving the output electrical signal from each of said photodetectors and for switching said output electrical signals in a multiplexed manner to an output thereof as a multiplexed electrical signal;

at least one amplifier for amplifying said multiplexed electrical signal, the number of amplifiers being less than the number of photodetectors, an analog to digital converter which converts the amplified electrical signal to a digital signal, and a microprocessor which provides an output measurement signal in response to the digital signal, said microprocessor being connected to said at least one switch to control a length of time that the at least one switch is open for each optical line.

2. A switched multichannel fiber optic power monitoring apparatus according to claim 1, wherein each photodetector is an integrated tap photodetector.

3. A switched multichannel fiber optic power monitoring apparatus according to claim 1, wherein said at least one switch includes:

a plurality of first switches, each having inputs connected to outputs of each of a plurality of said photodetectors for receiving the output electrical signal from each of said photodetectors and for switching said output electrical signals in a multiplexed manner to an output thereof as a first multiplexed electrical signal, and a second switch having inputs connected to outputs of said first switches for switching said first multiplexed electrical signals in a multiplexed manner to an output thereof as a second multiplexed electrical signal which is supplied to said amplifier.

4. A switched multichannel tapped fiber optic power monitoring apparatus, comprising:

a plurality of photodetectors, each photodetector connected to a tap of a different optical line for converting a small portion of an optical signal from the respective optical line to an electrical signal, at least one switch, the number of switches being less than the number of photodetectors, each switch having inputs connected to outputs of each of a plurality of said photodetectors for receiving the output electrical signal from each of said photodetectors and for switching said output electrical signals in a multiplexed manner to an output thereof as a multiplexed electrical signal, at least one amplifier for amplifying said multiplexed electrical signal, the number of amplifiers being less than the number of photodetectors, an analog to digital converter which converts the amplified electrical signal to a digital signal, and a microprocessor which provides an output measurement signal in response to the digital signal, said microprocessor being connected with said at least one amplifier to control amplification by said amplifier.

5. A switched multichannel fiber optic power monitoring apparatus according to claim 4, wherein:

said at least one switch includes a plurality of switches, each having inputs connected to outputs of each of a plurality of said photodetectors for receiving the output electrical signal from each of said photodetectors and for switching said output electrical signals in a multiplexed manner to an output thereof as a first multiplexed electrical signal, and said at least one amplifier includes a plurality of amplifiers, each amplifier having an input connected with an input of a respective one of said switches.

6. A switched multichannel fiber optic power monitoring apparatus according to claim 5, wherein outputs from said amplifiers are supplied directly to said microprocessor.

7. A switched multichannel fiber optic power monitoring apparatus according to claim 5, further including a further switch having inputs connected to outputs of each of said amplifiers and for switching output signals from said amplifiers in a multiplexed manner to said microprocessor.

8. A switched multichannel fiber optic power monitoring apparatus, comprising:

a plurality of tap photodetectors, each connected to a different optical line for converting an optical signal from the respective optical line to an electrical signal, at least one switch, the number of switches being leer than the number of photodetectors, each switch having inputs connected to outputs of each of a plurality of said photodetectors for receiving the output electrical signal from each of said photodetectors and for switching said output electrical signals in a multiplexed manner to an output thereof as a multiplexed electrical signal, at least one amplifier for amplifying said multiplexed electrical signal, the number of amplifiers being less than the number of photodetectors, an analog to digital converter which converts the amplified electrical signal to a digital signal, and a microprocessor which, in response to the digital signal, provides a calibrated output measurement signal which is calibrated with respect to at least one of the following:

temperature, input optical level, input optical wavelength and polarizations, and device parameters of the photodetectors, each switch, each amplifier, the analog to digital converter and the microprocessor.

9. A switched multichannel fiber optic power monitoring apparatus according to claim 8, wherein said microprocessor is connected to said switch to control a length of time that the at least one switch is open for each optical line.

10. A switched multichannel fiber optic power monitoring apparatus according to claim 8, wherein said microprocessor is connected with said at least one amplifier to control amplification by said amplifier.

11. A switched multichannel fiber optic power monitoring apparatus according to claim 8, wherein each photodetector is an integrated tap photodetector.

12. A switched multichannel fiber optic power monitoring apparatus according to claim 8, wherein each photodetector is connected to a tap of one of said optical lines for converting a small portion of the optical signal from the respective optical line to the electrical signal.

13. A switched multichannel fiber optic power monitoring apparatus according to claim 8, wherein said at least one switch includes:

a plurality of first switches, each having inputs connected to outputs of each of a plurality of said photodetectors for receiving the output electrical signal from each of said photodetectors and for switching said output electrical signals in a multiplexed manner to an output thereof as a first multiplexed electrical signal, and a second switch having inputs connected to outputs of said first switches for switching said first multiplexed electrical signals in a multiplexed manner to an output thereof as a second multiplexed electrical signal which is supplied to said amplifier.

14. A switched multichannel fiber optic power monitoring apparatus according to claim 8, wherein:

said at least one switch includes a plurality of switches, each having inputs connected to outputs of each of a plurality of said photodetectors for receiving the output electrical signal from each of said photodetectors and for switching said output electrical signals in a multiplexed manner to an output thereof as a first multiplexed electrical signal, and said at least one amplifier includes a plurality of amplifiers, each amplifier having an input connected with an input of a respective one of said switches.

15. A switched multichannel fiber optic power monitoring apparatus according to claim 14, wherein outputs from said amplifiers are supplied directly to said microprocessor.

16. A switched multichannel fiber optic power monitoring apparatus according to claim 14, further including a further switch having inputs connected to outputs of each of said amplifiers and for switching output signals from said amplifiers in a multiplexed manner to said microprocessor.

17. A switched multichannel fiber optic power monitoring apparatus according to claim 8, wherein each said amplifier includes a logarithmic amplifier.

* * * * *